S. HOFFHEINS.
Wheel-Cultivator.
No. 54,160. Patented Apr. 24, 1866.
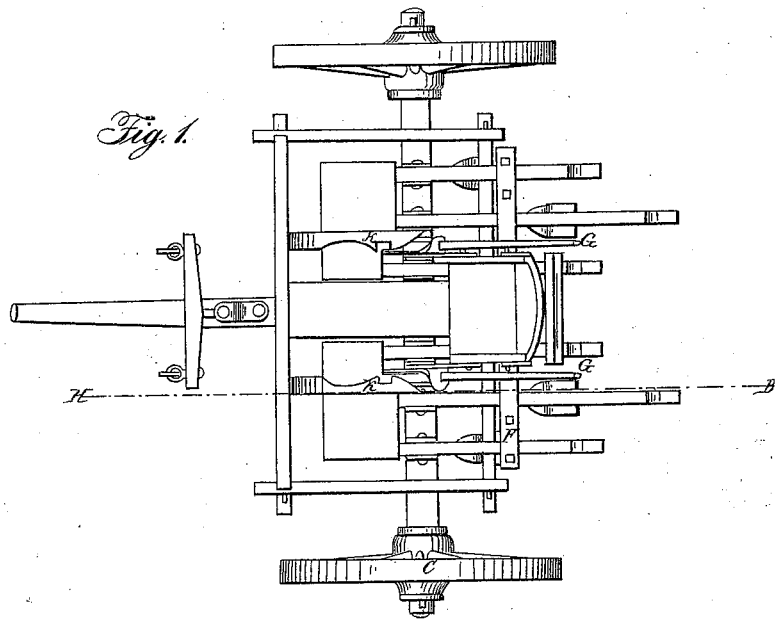
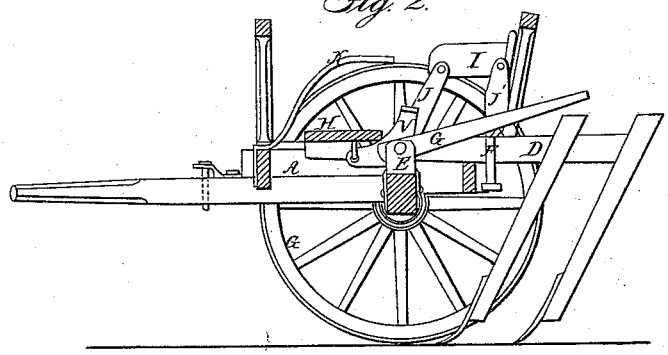
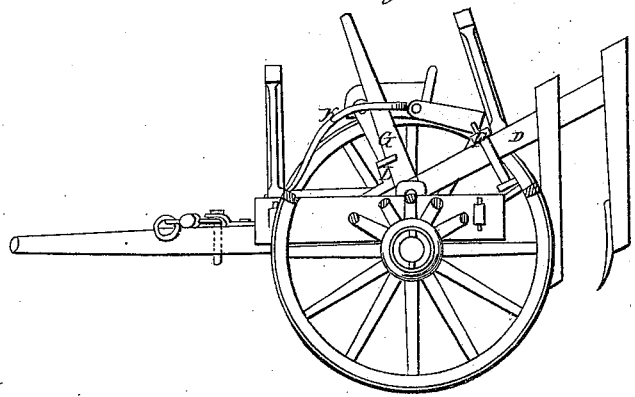
Witnesses:
Inventor:

UNITED STATES PATENT OFFICE.

SAMUEL HOFFHEINS, OF NEW OXFORD, PENNSYLVANIA.

IMPROVEMENT IN CULTIVATORS.

Specification forming part of Letters Patent No. 54,160, dated April 24, 1866.

*To all whom it may concern:*

Be it known that I, SAMUEL HOFFHEINS, of New Oxford, in the county of Adams, and State of Pennsylvania, have made new and useful Improvements in Cultivators; and I do hereby declare the following to be a full, clear, and exact description of the nature, construction, and operation of the same sufficient to enable one skilled in the art to which it appertains to construct and use the same, reference being had to the accompanying drawings, which are made part of this specification, and in which—

Figure 1 is a top or plan view. Fig. 2 is a section on the line H B, Fig. 1. Fig. 3 is a side elevation, a part of the near wheel being removed.

The invention consists in the combination of devices for elevating the cultivator-beams.

The machine is so arranged as to be lifted by a right or left hand lever, or by a right or left hand treadle, or by the forward motion of the driver on the pivoted seat.

The machine consists of a frame, A, on an axle, B, and wheels C, and a double set of plow-beams, D D, pivoted to standards on the axle.

F is a frame, with uprights between the beams to secure a certain degree of simultaneous motion to the beams, while admitting some degree of independent motion to the plows on the right and those on the left hand, respectively, of the middle of the axle. On the forward ends of the beams are treadle or foot-boards H, by pressure on which the rear ends of the beams are elevated, bringing the shovels out of the ground, as shown in Fig. 3.

To perform the same operation by hand, either of the levers G G, on the right and left hands, respectively, of the seat of the driver, is vibrated forward. The levers are pivoted to standards on the axle, and their forward ends are attached to the pieces to which they are united by staple to the under side of the foot-boards H, and the shovels are maintained in their elevated position by the engagement of the levers, either or both, with the catch or catches K' K.

The seat T is supported upon pivoted arms J J', on each side, so that the weight of the driver can be thrown either backward or forward, as may be desired, either to keep the shovels in the ground, or by launching forward to help counterbalance the rear weight of the beams and lift the shovels from the ground.

Having described my invention, what I claim therein as new, and desire to secure by Letters Patent, is—

The combination of the devices for raising the shovels from the ground, and consisting of the levers G G, foot-boards H H, and rocking seat I, operating substantially as described and represented.

The above specification of my improvement in cultivators signed this 23d day of January, 1866.

SAMUEL HOFFHEINS.

Witnesses:
  ALEXR. A. C. KLAUCKE,
  W. F. HALL.